(12) United States Patent
Tu et al.

(10) Patent No.: US 10,007,785 B2
(45) Date of Patent: Jun. 26, 2018

(54) METHOD AND APPARATUS FOR IMPLEMENTING VIRTUAL MACHINE INTROSPECTION

(71) Applicant: Huawei Technologies Co., Ltd., Shenzhen (CN)

(72) Inventors: Bin Tu, Shenzhen (CN); Haibo Chen, Shanghai (CN); Yubin Xia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 223 days.

(21) Appl. No.: 15/199,200

(22) Filed: Jun. 30, 2016

(65) Prior Publication Data

US 2016/0314297 A1    Oct. 27, 2016

Related U.S. Application Data

(63) Continuation of application No. PCT/CN2014/093427, filed on Dec. 10, 2014.

(30) Foreign Application Priority Data

Dec. 30, 2013   (CN) .......................... 2013 1 0746868

(51) Int. Cl.
   *G06F 11/00*   (2006.01)
   *G06F 21/56*   (2013.01)
   *G06F 9/455*   (2018.01)
   *G06F 21/53*   (2013.01)

(52) U.S. Cl.
   CPC ........ *G06F 21/565* (2013.01); *G06F 9/45558* (2013.01); *G06F 21/53* (2013.01);
   (Continued)

(58) Field of Classification Search
   CPC .................. G06F 21/565; G06F 21/53; G06F 2009/45587
   (Continued)

(56) References Cited

U.S. PATENT DOCUMENTS

| 7,392,541 B2 * | 6/2008 | Largman ................. G06F 21/53 726/17 |
| 7,788,699 B2 * | 8/2010 | Largman ............. G06F 11/1417 726/1 |

(Continued)

FOREIGN PATENT DOCUMENTS

| CN | 1508696 A | 6/2004 |
| CN | 1525328 A | 9/2004 |

(Continued)

OTHER PUBLICATIONS

Foreign Communication From a Counterpart Application, Chinese Application No. 201310746868.1, Chinese Office Action dated Aug. 22, 2017, 5 pages.

(Continued)

*Primary Examiner* — Teshome Hailu
(74) *Attorney, Agent, or Firm* — Conley Rose, P.C.

(57) ABSTRACT

The present disclosure relates to the field of information technologies and discloses a method and an apparatus for implementing virtual machine introspection. The method provided in the present disclosure may further include: determining to-be-checked data in a virtual machine; starting to read the to-be-checked data, saving a copy of the read to-be-checked data, and storing a storage address of the read to-be-checked data in a hardware transactional memory, so that the hardware transactional memory is capable of monitoring the read to-be-checked data according to the storage address; when the read to-be-checked data is modified, stop reading the to-be-checked data, and delete the copy; and when reading the to-be-checked data is completed and it is not detected that the read to-be-checked data is modified, performing security check on the copy. The method can be applied to virtual machine introspection.

12 Claims, 5 Drawing Sheets

(52) U.S. Cl.
CPC .............. *G06F 2009/45587* (2013.01); *G06F 2009/45591* (2013.01); *G06F 2221/034* (2013.01)

(58) Field of Classification Search
USPC .......................................................... 726/23
See application file for complete search history.

(56) References Cited

U.S. PATENT DOCUMENTS

| | | | |
|---|---|---|---|
| 7,984,304 | B1 | 7/2011 | Waldspurger et al. |
| 8,549,198 | B2 * | 10/2013 | Cohen ................. G06F 13/4004 710/106 |
| 9,229,881 | B2 * | 1/2016 | Epstein ............... G06F 12/1475 |
| 9,535,855 | B2 * | 1/2017 | Epstein ............... G06F 12/1475 |
| 2004/0123052 | A1 | 6/2004 | Beers et al. |
| 2004/0172424 | A1 | 9/2004 | Edelstein et al. |
| 2006/0253712 | A1 | 11/2006 | Armingaud et al. |
| 2007/0028104 | A1 * | 2/2007 | Cohen .................... H04L 63/08 713/170 |
| 2010/0251238 | A1 | 9/2010 | Schuba et al. |

FOREIGN PATENT DOCUMENTS

| | | |
|---|---|---|
| CN | 1823318 A | 8/2006 |
| CN | 101814049 A | 8/2010 |
| CN | 101853175 A | 10/2010 |
| CN | 102147843 A | 8/2011 |
| CN | 102541691 A | 7/2012 |

OTHER PUBLICATIONS

Partial English Translation and Abstract of Chinese Patent Application No. CN102147843, Aug. 10, 2011, 9 pages.

Partial English Translation and Abstract of Chinese Patent Application No. CN102541691, Jul. 4, 2012, 4 pages.

Hofmann, O., et al., "Ensuring Operating System Kernel Integrity with OSck," ASPLOS, Mar. 5-11, 2011, 12 pages.

Dolan-Gavitt, B., et al., "Virtuoso: Narrowing the Semantic Gap in Virtual Machine Introspection," Proceedings of the 2011 Symposium on Security and Privacy, May 22-25, 2011, 16 pages.

Garfinkel, T., et al., "A Virtual Machine Introspection Based Architecture for Intrusion Detection," XP002421090, Proceedings of the Symposium on Network and Distributed System Security, Feb. 2003, 16 pages.

Payne, B., et al., "Lares: An Architecture for Secure Active Monitoring Using Virtualization," XP031259108, IEEE Symposium on Security and Privacy, May 18-22, 2008, pp. 233-247.

Birgisson, A., et al., "Enforcing Authorization Policies using Transactional Memory Introspection," XP055197982, Proceedings of the 15th ACM Conference on Computer and Communications Security, Oct. 27-31, 2008, 12 pages.

Jin, S., et al., "Architectural Support for Secure Virtualization under a Vulnerable Hypervisor," XP055289934, Micro, Dec. 3-7, 2011, 12 pages.

Foreign Communication From a Counterpart Application, European Application No. 14876189.3, Extended European Search Report dated Dec. 20, 2016, 10 pages.

Foreign Communication From a Counterpart Application, PCT Application No. PCT/CN2014/093427, English Translation of International Search Report dated Jan. 28, 2015, 2 pages.

Foreign Communication From a Counterpart Application, PCT Application No. PCT/CN2014/093427, English Translation of Written Opinion dated Jan. 28, 2015, 9 pages.

* cited by examiner

METHOD AND APPARATUS FOR IMPLEMENTING VIRTUAL MACHINE INTROSPECTION

CROSS-REFERENCE TO RELATED APPLICATIONS

This application is a continuation of International Application No. PCT/CN2014/093427, filed on Dec. 10, 2014, which claims priority to Chinese Patent Application No. 201310746868.1, filed on Dec. 30, 2013, both of which are hereby incorporated by reference in their entireties.

TECHNICAL FIELD

The present disclosure relates to the field of information technologies, and in particular, to a method and an apparatus for implementing virtual machine introspection.

BACKGROUND

In various technologies for enhancing computer security, a virtual machine introspection (VMI) technology can be preferably used to perform security protection on a virtual machine (VM). A VMI system may run in a virtual machine monitor (VMM), and the VMM may enhance security performance of a VM from the exterior of the VM by using the VMI system, so as to implement protection on the VM. Further, the VMM may monitor an internal running status of the VM outside the VM by using the VMI system, for example, the VMI system may directly scan a memory and a magnetic disk of the VM, monitor a network behavior, and the like to perform security check on the VM. After the VMI technology is used, because the VMI system runs outside the VM, the running of the VMI system cannot be interfered with even if the VM has been infected by malware.

Specific security detection steps may include: the VMI system may acquire to-be-checked in-memory data from the VM; and perform security check on the acquired to-be-checked in-memory data.

However, when the VMI system performs security check on the in-memory data in the VM, the VM may also be accessing the to-be-checked in-memory data. In this case, the VM modifies, after the VMI system acquires a part of the to-be-checked in-memory data, local in-memory data corresponding to the part of the to-be-checked in-memory data, resulting in that the in-memory data acquired by the VMI system is inconsistent with the local in-memory data in the VM, and further resulting in that the VMI system cannot accurately perform security check on the in-memory data in the VM.

SUMMARY

The present disclosure provides a method and an apparatus for implementing virtual machine introspection, so as to resolve a problem that a VMI system cannot accurately perform security check on data in a VM.

To achieve the foregoing objective, the following technical solutions are used in the present disclosure.

According to a first aspect, a method for implementing virtual machine introspection is provided, including: determining to-be-checked data in a virtual machine; starting to read the to-be-checked data, saving a copy of the read to-be-checked data, and storing a storage address of the read to-be-checked data in a hardware transactional memory, so that the hardware transactional memory is capable of monitoring the read to-be-checked data according to the storage address; when it is detected that the read to-be-checked data is modified, stopping reading the to-be-checked data, and deleting the copy; and when reading the to-be-checked data is completed and it is not detected that the read to-be-checked data is modified, performing security check on the copy.

With reference to the first aspect, in a first implementation manner of the first aspect, the to-be-checked data includes lock-related data, where the lock-related data is used to represent whether the to-be-checked data is being accessed currently; and after the determining to-be-checked data in a virtual machine, the method further includes: determining whether a lock corresponding to the lock-related data is in a release state, where the release state is used to represent that the to-be-checked data is not accessed currently, where the starting to read the to-be-checked data, saving a copy of the read to-be-checked data, and storing a storage address of the read to-be-checked data in a hardware transactional memory, so that the hardware transactional memory is capable of monitoring the read to-be-checked data according to the storage address includes: if the lock corresponding to the lock-related data is in the release state, starting to read the to-be-checked data, saving the copy of the read to-be-checked data, and storing the storage address of the read to-be-checked data in the hardware transactional memory, so that the hardware transactional memory is capable of monitoring the read to-be-checked data according to the storage address.

With reference to the first aspect or the first implementation manner of the first aspect, in a second implementation manner, the performing security check on the copy includes: checking integrity of the copy; and/or determining, according to the copy, whether malware exists in a system in which the virtual machine runs.

With reference to the first aspect, the first implementation manner of the first aspect, or the second implementation manner of the first aspect, in a third implementation manner, after the performing security check on the copy, the method further includes: if the security check on the copy fails, sending a security check failure message to the virtual machine, so that the virtual machine performs corresponding processing according to the security check failure message.

With reference to the first aspect or any one of the first implementation manner of the first aspect to the third implementation manner of the first aspect, in a fourth implementation manner, the method further includes: when it is detected that the read to-be-checked data is modified, acquiring a storage address of modified to-be-checked data; and sending an access violation message to the virtual machine, where the access violation message includes the storage address of the modified to-be-checked data, so that the virtual machine determines whether a process for modifying the modified to-be-stored data is a secure process.

According to a second aspect, an apparatus for implementing virtual machine introspection is provided, including: a determining unit configured to determine to-be-checked data in a virtual machine; a read unit configured to read the to-be-checked data determined by the determining unit, save a copy of the read to-be-checked data, and store a storage address of the read to-be-checked data in a hardware transactional memory; a monitoring unit configured to monitor, by using the hardware transactional memory, whether the read to-be-checked data corresponding to the storage address is modified; a ending unit configured to, when the monitoring unit detects that the read to-be-checked data is modified, stop reading the to-be-checked data, and delete the copy; and a security check unit configured to, when the read unit completes reading the to-be-checked data and the monitoring unit does not detect that the read to-be-checked data is modified, perform security check on the copy.

With reference to the second aspect, in a first implementation manner of the second aspect, the copy saved by the read unit includes lock-related data, where the lock-related data is used to represent whether the to-be-checked data determined by the determining unit is being accessed currently; and the apparatus further includes a judging unit configured to, after the determining unit determines the to-be-checked data in the virtual machine, determine whether a lock corresponding to the lock-related data is in a release state, where the release state is used to represent that the to-be-checked data is not accessed currently, where the read unit is further configured to, if the lock corresponding to the lock-related data is in the release state, start to read the to-be-checked data, save the copy of the read to-be-checked data, and store the storage address of the read to-be-checked data in the hardware transactional memory, so that the hardware transactional memory is capable of monitoring the read to-be-checked data according to the storage address.

With reference to the second aspect or the first implementation manner of the second aspect, in a second implementation manner, the security check unit is further configured to check integrity of the copy saved by the read unit; and/or determine, according to the copy saved by the read unit, whether malware exists in a system in which the virtual machine runs.

With reference to the second aspect, the first implementation manner of the second aspect, or the second implementation manner of the second aspect, in a third implementation manner, the apparatus further includes a sending unit configured to, when the security check unit completes the security check that is performed on the copy saved by the read unit, if the security check performed by the security check unit on the copy fails, send a security check failure message to the virtual machine, so that the virtual machine performs corresponding processing according to the security check failure message sent by the sending unit.

With reference to the second aspect or any one of the first implementation manner of the second aspect to the third implementation manner of the second aspect, in a fourth implementation manner, the apparatus further includes an acquiring unit configured to, when the monitoring unit detects that the read to-be-checked data is modified, acquire a storage address of modified to-be-checked data, where the sending unit is further configured to, when the acquiring unit acquires the storage address of the modified data in the read to-be-checked data, send an access violation message to the virtual machine, where the access violation message includes the storage address of the modified to-be-checked data, so that the virtual machine determines whether a process for modifying the modified to-be-stored data is a secure process.

According to the method and the apparatus for implementing virtual machine introspection that are provided in the present disclosure, in a process of reading the to-be-checked data, whether the read to-be-checked data is modified may be monitored by using a hardware transactional memory. If it is not detected, in the process of reading to-be-checked data, that modified data exists in the read to-be-checked data, it represents that a copy is consistent with to-be-checked data in a virtual machine. In this case, security check may be performed on the copy. If it is detected, in the process of reading the to-be-checked data, that modified data exists in the read to-be-checked data, reading the to-be-checked data is stopped, and the copy is deleted, that is, security check is not performed on the to-be-checked data. In this way, accuracy of the security check is improved.

In addition, the present disclosure further describes that, before the to-be-checked data is read, it is first determined whether a lock of the to-be-checked data is in a release state. The to-be-checked data is read only when the lock is in the release state. In this way, it is ensured that when reading the to-be-checked data is started, no other process accesses the to-be-checked data, so that occurrence times of an access violation is decreased, and further, a probability that the read to-be-checked data is modified in the reading process is reduced. Further, lock-related data corresponding to the lock may be read, that is, the copy includes the lock-related data. In this way, after reading the lock-related data is completed, a storage address of the lock-related data in the virtual machine is stored in the hardware transactional memory, and the hardware transactional memory further monitors the lock-related data. If it is not detected, in the process of reading the to-be-checked data, that modified data exists in the read to-be-checked data, not only it may represent that the copy is consistent with the to-be-checked data in the virtual machine, but also it may represent that in the process of reading the to-be-checked data, no other process accesses the to-be-checked data, so that consistency between the copy and the to-be-checked data in the virtual machine is ensured more strictly.

Further, the present disclosure further describes that, if the read to-be-checked data is modified in the reading process, a storage address of modified data in the read to-be-checked data is acquired, and an access violation message is sent to the virtual machine; the virtual machine may immediately locate, according to the storage address of the modified data in the access violation message, a location at which violation access occurs, and determine whether a process for modifying the modified data is a secure process. In this way, determining, by the virtual machine, the location at which the violation access occurs is accelerated, so that efficiency of detecting malware is improved. Therefore, security of the virtual machine is improved.

BRIEF DESCRIPTION OF DRAWINGS

To describe the technical solutions in embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In recent years, with popularization of personal computers, mobile computing devices, and cloud computing, computer security has gradually drawn attention of people. People save, in various computing devices, a large amount of key data, including emails, personal photographs, bank account numbers and passwords, social network accounts, and the like, which enables the computing devices to become an attack target of hackers. Various pieces of malware, such as viruses, Trojan horses, spyware, fraudulent advertising, and the like are increasing, which causes an increasingly strong threat.

In the prior art, security protection on a virtual machine may be implemented by using a VMI technology. However, in a process for implementing security protection on the virtual machine by means of VMI, when a VMI system performs security check on in-memory data in the virtual machine, the virtual machine may also be accessing the to-be-checked in-memory data. In this case, the virtual machine modifies, after the VMI system acquires a part of the to-be-checked in-memory data, local in-memory data corresponding to the part of the to-be-checked in-memory data, resulting in that the in-memory data acquired by the VMI system is inconsistent with the local in-memory data in the virtual machine, and further resulting in that the VMI system cannot accurately perform security check on the in-memory data in the virtual machine. To resolve the problem, the following provides some embodiments for specific description.

Figure 1:
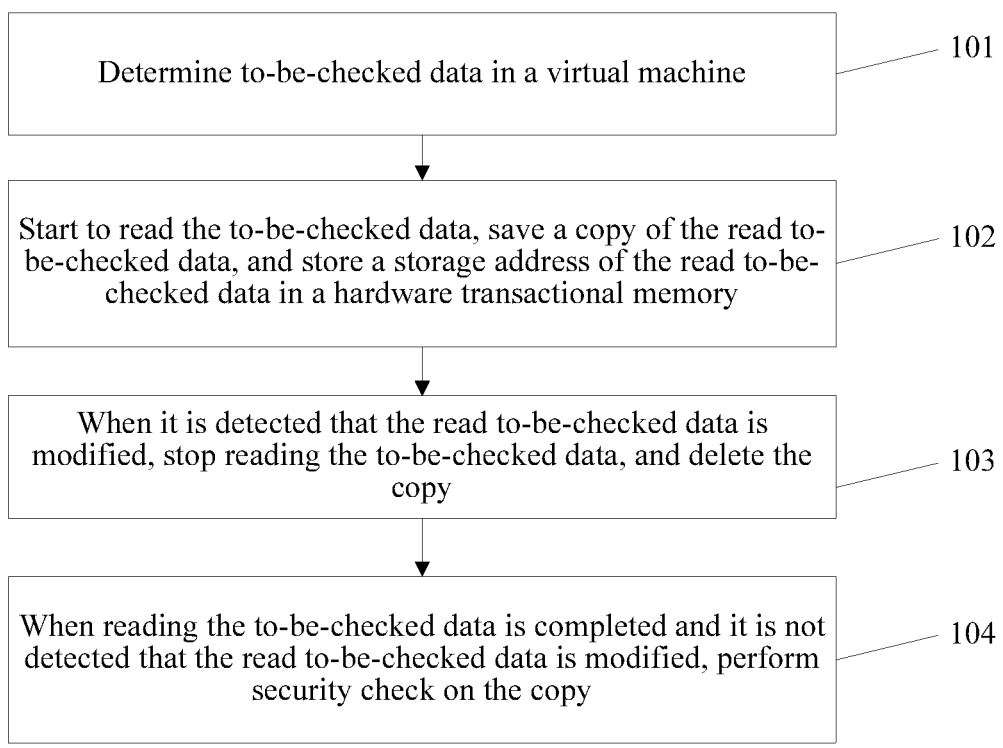
FIG. 1 is a flowchart of a method for implementing virtual machine introspection according to an embodiment.

This embodiment provides a method for implementing virtual machine introspection. As shown in FIG. 1, the method may include the following steps:

101: Determine to-be-checked data in a virtual machine.

The to-be-checked data may be in-memory data in a memory of the virtual machine.

102: Start to read the to-be-checked data, save a copy of the read to-be-checked data, and store a storage address of the read to-be-checked data in a hardware transactional memory, so that the hardware transactional memory is capable of monitoring the read to-be-checked data according to the storage address.

When the to-be-checked data is read, the storage address of the read to-be-checked data in the virtual machine is automatically stored in the hardware transactional memory. In addition, the copy of the read to-be-checked data may also be stored in the hardware transactional memory.

The hardware transactional memory may monitor data corresponding to a locally stored storage address, that is, may monitor whether the data is modified, and the like. In this embodiment, because the storage address of the read to-be-checked data is stored in the hardware transactional memory, the hardware transactional memory may monitor whether the read to-be-checked data is modified.

103: When it is detected that the read to-be-checked data is modified, stop reading the to-be-checked data, and delete the copy of the to-be-checked data.

In a reading process, if the read to-be-checked data is modified, it represents that data in the copy of the to-be-checked data is inconsistent with the to-be-checked data in the virtual machine. Because security check cannot be correctly performed on the copy of the to-be-checked data in a case in which data is inconsistent, in a process of reading the to-be-checked data, if the hardware transactional memory detects that the read to-be-checked data is modified, security check is not performed on the copy of the to-be-checked data, reading the to-be-checked data is stopped, and the copy of the to-be-checked data is deleted.

It should be noted that inconsistency of data provided in this embodiment refers to inconsistency between the read to-be-checked data and the to-be-checked data in the virtual machine, which is not described again in the following.

104: When reading the to-be-checked data is completed and it is not detected that the read to-be-checked data is modified, perform security check on the copy of the to-be-checked data.

In the process of reading the to-be-checked data, if the read to-be-checked data is not modified, it represents that the data in the copy of the to-be-checked data is consistent with the to-be-checked data in the virtual machine. In this case, security check may be performed on the copy of the to-be-checked data.

In this embodiment, in a process of reading to-be-checked data, whether the read to-be-checked data is modified may be monitored by using a hardware transactional memory. If it is not detected, in the process of reading the to-be-checked data, that modified data exists in the read to-be-checked data, it represents that a copy is consistent with to-be-checked data in a virtual machine. In this case, security check may be performed on the copy of the to-be-checked data. If it is detected, in the process of reading the to-be-checked data, that modified data exists in the read to-be-checked data, reading the to-be-checked data is stopped, and the copy of the to-be-checked data is deleted, that is, security check is not performed on the to-be-checked data. In this way, accuracy of the security check is improved.

Figure 2:
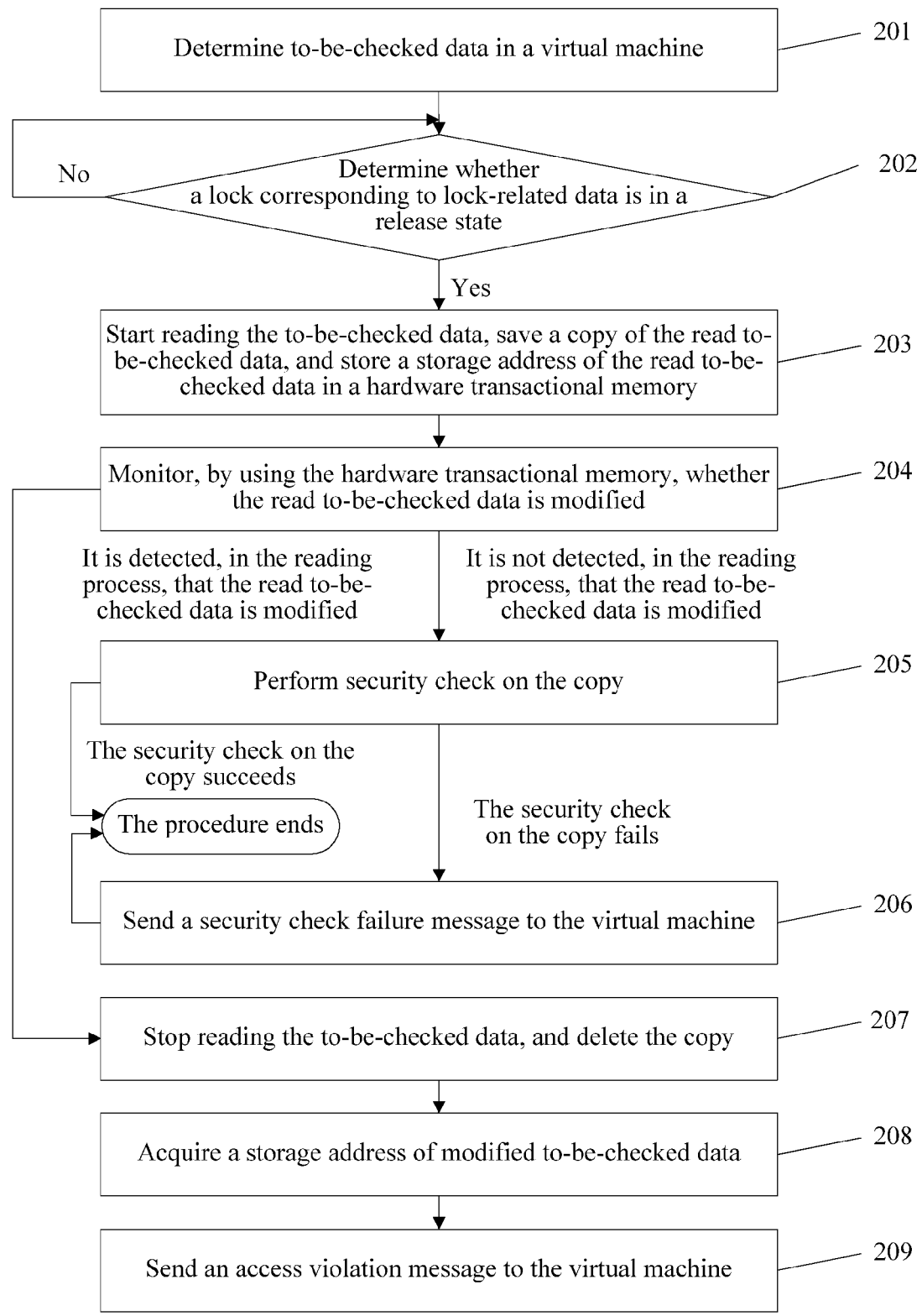
FIG. 2 is a flowchart of another method for implementing virtual machine introspection according to an embodiment.

This embodiment provides another method for implementing virtual machine introspection. The method is further expansion and optimization of the method shown in FIG. 1. As shown in FIG. 2, the method may include the following steps:

201: Determine to-be-checked data in a virtual machine.

202: Determine whether a lock corresponding to lock-related data is in a release state. If the lock is in the release state, step 203 is performed; or if the lock is not in the release state, step 202 is performed.

The release state may be used to represent that the to-be-checked data is not accessed currently.

To avoid that the to-be-checked data in the virtual machine is accessed by multiple processes at the same time, a lock is set. The lock may be stored in a to-be-checked virtual machine in a form of lock-related data. A status of the lock of the to-be-checked data may be used to represent whether the to-be-checked data is being accessed by a process in the virtual machine system. When no process in the virtual machine system accesses the to-be-checked data, the status of the lock is the release state; and when a process in the virtual machine system accesses the to-be-checked data, the status of the lock is a locked state. The status of the lock is first determined before a process in the virtual machine system accesses the to-be-checked data. If the lock is in the release state, the to-be-checked data may be accessed; or if the lock is in the locked state, the to-be-checked data cannot be accessed.

If the lock is in the release state currently, the lock needs to be acquired when a process in the virtual machine system accesses the to-be-checked data. After the process acquires the lock, the status of the lock is switched from the release state to a locked state. After the process accesses the to-be-checked data, the process may release the lock, so that the status of the lock may be switched from the locked state to the release state, and a change in the status may be reflected by using a change in a value of lock-related data that is stored in the virtual machine and that corresponds to the lock.

If a VMI system detects that the lock is in the locked state currently, it represents that a process in the virtual machine system is accessing the to-be-checked data currently. In this case, if the VMI system reads the to-be-checked data, because a process may modify the to-be-checked data, a case in which data read by the virtual machine system is inconsistent with the to-be-checked data occurs, which further causes that security check cannot be performed on the virtual machine accurately. Therefore, if the VMI system detects that the lock is in the locked state currently, the VMI system may not perform security check on the virtual machine. Instead, the VMI system continues to monitor the status of the lock, and may perform security check until the VMI system detects that the status of the lock is switched to a release state.

In an implementation manner of this embodiment, the VMI system may determine, by using a value of the lock-related data, whether the lock corresponding to the lock-related data is in the release state.

The principle and an implementation manner of the lock are not limited in this embodiment. The principle and the implementation manner are an existing technology, are a technology that is well known to a person skilled in the art, and are not described herein again.

203: Start to read the to-be-checked data, save a copy of the read to-be-checked data, and store a storage address of the read to-be-checked data in a hardware transactional memory.

If the VMI system detects that a current status of the lock is a release state, it represents that no process accesses the to-be-checked data. In this case, the VMI system may read the to-be-checked data, store the storage address of the read to-be-checked data in the hardware transactional memory, and save the copy of the read to-be-checked data.

The hardware transactional memory may be disposed in a VMM. A read set may be included in the hardware transactional memory, where the read set may be used to store the storage address of the data that has been read by the VMI system. In this embodiment, in a process in which the VMI system reads the to-be-checked data, a storage address, in the virtual machine, of the to-be-checked data that has been read by the VMI system is automatically stored in the read set. In addition, in the process in which the VMI system reads the to-be-checked data, the VMI system may further store the copy of the read to-be-checked data in the hardware transactional memory.

It should be noted that the storage address of the to-be-checked data provided in this embodiment refers to the storage address of the to-be-checked data in the virtual machine, which is not described again in the following content.

204: Monitor, by using the hardware transactional memory, whether the read to-be-checked data is modified. If it is not detected, in a reading process, that the read to-be-checked data is modified, step 205 is performed; or if it is detected, in a reading process, that the read to-be-checked data is modified, step 207 is performed.

The hardware transactional memory may monitor the data corresponding to the storage address in the read set, further, may monitor whether the data is modified.

In an implementation manner of this embodiment, in the process in which the VMI system reads the to-be-checked data, the storage address of the read to-be-checked data may be automatically stored in the read set. After that, because the storage address of the read to-be-checked data is stored in the read set, the hardware transactional memory may monitor whether the read to-be-checked data is modified.

Further, the VMI system may further read lock-related data of the to-be-checked data, the lock-related data may be stored in a memory of the virtual machine. In this way, after the VMI system completes reading the lock-related data, a storage address of the lock-related data in the virtual machine is stored in the read set, and the copy of the to-be-checked data also includes the lock-related data. The hardware transactional memory further monitors the lock-related data. Because the lock-related data is in a release state when the VMI system starts to read the lock-related data, in a process of reading the to-be-checked data, the hardware transactional memory not only may monitor whether the to-be-checked data is modified, but also may monitor whether a status of the lock-related data is changed, that is, whether the status is switched from a release state to a locked state. In this case, the copy also includes the lock-related data.

A method in which the hardware transactional memory monitors whether the read to-be-checked data is modified is not limited in this embodiment. The method is a technology that is well known to a person skilled in the art, and is not described herein again.

205: Perform security check on the copy of the to-be-checked data. If the security check on the copy of the to-be-checked data succeeds, the procedure ends, or step 201 is performed after a preset time; or if the security check on the copy of the to-be-checked data fails, step 206 is performed.

Further, the performing security check on the copy of the to-be-checked data may include, but not be limited to:

The VMI system checks integrity of the copy of the to-be-checked data; and/or the VMI system determines, according to the copy of the to-be-checked data, whether malware exists in a system in which the virtual machine runs.

Further, that the VMI system checks integrity of the copy of the to-be-checked data may include, but not be limited to the VMI system may check, by using a checksum, whether data in the copy of the to-be-checked data is complete. A specific check method is a technology that is well known to a person skilled in the art, and is not described herein again.

That the VMI system determines, according to the copy of the to-be-checked data, whether malware exists in a system in which the virtual machine runs may include, but not be limited to, if malware runs in the virtual machine system, an identifier may be left in data in the virtual machine, for example, the identifier may be reflected in a segment of data. Therefore, the VMI system may check the copy of the to-be-checked data, and determine whether the identifier left by the malware is included in the copy of the to-be-checked data, and if the identifier left by the malware is included in the copy of the to-be-checked data, it represents that the malware exists in the virtual machine system. A method in which the VMI system determines, according to the copy of the to-be-checked data, whether malware exists in a system in which the virtual machine runs is not limited in this embodiment. The method is a technology that is well known to a person skilled in the art, and is not described herein again.

A method in which the VMI system performs security check on the copy of the to-be-checked data is not limited in this embodiment. The method is a technology that is well known to a person skilled in the art and is not limited to the method listed above. The method may be set further according to an actual requirement.

206: Send a security check failure message to the virtual machine, so that the virtual machine performs corresponding processing according to the security check failure message.

In an implementation manner of this embodiment, if the VMI system detects that the malware exists in the system in which the virtual machine runs, after receiving the security check failure message, the virtual machine may stop running the malware according to the security check failure message; and if the VMI system detects that data in the copy of the to-be-checked data is incomplete, after receiving the security check failure message, the virtual machine may repair the incomplete data in the to-be-checked data according to the security check failure message.

The corresponding processing performed by the virtual machine according to the security check failure message is not limited in this embodiment. The method of the corresponding processing is a technology that is well known to a person skilled in the art, may be set according to an actual requirement, and is not described herein again.

The procedure ends.

207: Stop reading the to-be-checked data, and delete the copy of the to-be-checked data.

In the reading process, if the hardware transactional memory detects that the read to-be-checked data is modified, it represents that the copy of the to-be-checked data is inconsistent with the read to-be-checked data. In this case, because the VMI system cannot accurately perform security check on the copy, the VMI system stops reading the to-be-checked data, and deletes the copy. After that, the VMI system may further restart the security check step, that is, may perform step 201.

Because when a process in the virtual machine system accesses the to-be-checked data, the lock is acquired first. In this case, corresponding lock-related data may be changed. Therefore, after the VMI system reads the lock-related data, the lock-related data is detected by the hardware transactional memory, so that the process of the security check is ended. In this way, consistency between the copy and the to-be-checked data in the virtual machine is ensured more strictly.

It should be noted that, that the VMI system reads the lock-related data may include copying the lock-related data, and then acquiring lock-related data that is acquired by copying, instead of acquiring the lock-related data. Therefore, after reading the lock-related data, the VMI system does not change a status of the lock or change a code of the lock-related data. As a result, some malware cannot temporarily stop, after determining, according to the lock-related data, that the VMI system is currently performing security check on the virtual machine, an infringement operation by modifying data.

208: Acquire a storage address of modified to-be-checked data.

In this embodiment, the VMI system may acquire the modified data from the read to-be-checked data, and then further acquire a storage address of the modified data in the virtual machine.

209: Send an access violation message to the virtual machine, so that the virtual machine determines whether a process for modifying the modified to-be-stored data is a secure process.

In an implementation manner of this embodiment, in the reading process, if the read to-be-checked data is modified, the access violation message may be sent to the virtual machine to notify the virtual machine that an access violation of the to-be-checked data occurs, where the access violation message may include the storage address of the modified data. The virtual machine may quickly locate, according to the storage address of the modified data in the access violation message, a location at which the access violation occurs, and may further determine, according to the location, whether the process for modifying the modified data is a secure process.

In this embodiment, in a process of reading to-be-checked data, whether the read to-be-checked data is modified may be monitored by using a hardware transactional memory. If it is not detected, in the process of reading the to-be-checked data, that modified data exists in the read to-be-checked data, it represents that the copy of the to-be-checked data is consistent with to-be-checked data in a virtual machine. In this case, security check may be performed on the copy of the to-be-checked data. If it is detected, in the process of reading the to-be-checked data, that modified data exists in the read to-be-checked data, reading the to-be-checked data is stopped, and the copy of the to-be-checked data is deleted, that is, security check is not performed on the to-be-checked data. In this way, accuracy of the security check is improved.

In addition, the present disclosure further describes that, before the to-be-checked data is read, it is first determined whether a lock of the to-be-checked data is in a release state. The to-be-checked data is read only when the lock is in the release state. In this way, it is ensured that when reading the to-be-checked data is started, no other process accesses the to-be-checked data, so that occurrence times of an access violation is decreased, and further, a probability that the read to-be-checked data is modified in the reading process is reduced. Further, lock-related data corresponding to the lock may be read, that is, the copy of the to-be-checked data includes the lock-related data. In this way, after reading the lock-related data is completed, a storage address of the lock-related data in the virtual machine is stored in the hardware transactional memory, and the hardware transactional memory further monitors the lock-related data. If it is not detected, in the process of reading the to-be-checked data, that modified data exists in the read to-be-checked data, not only it may represent that the copy of the to-be-checked data is consistent with the to-be-checked data in the virtual machine, but also it may represent that in the process of reading the to-be-checked data, no other process accesses the to-be-checked data, so that consistency between the copy of the to-be-checked data and the to-be-checked data in the virtual machine is ensured more strictly.

Further, the present disclosure further describes that, if the read to-be-checked data is modified in the reading process, a storage address of modified data in the read to-be-checked data is acquired, and an access violation message is sent to the virtual machine; the virtual machine may immediately locate, according to the storage address of the modified data in the access violation message, a location at which violation access occurs, and determine whether a process for modifying the modified data is a secure process. In this way, determining, by the virtual machine, the location at which the violation access occurs is accelerated, so that efficiency of detecting malware is improved. Therefore, security of the virtual machine is improved.

The following provides some embodiments of a virtual apparatus, and the embodiments of a virtual apparatus respectively correspond to the corresponding method embodiments provided in the foregoing.

Figure 3:
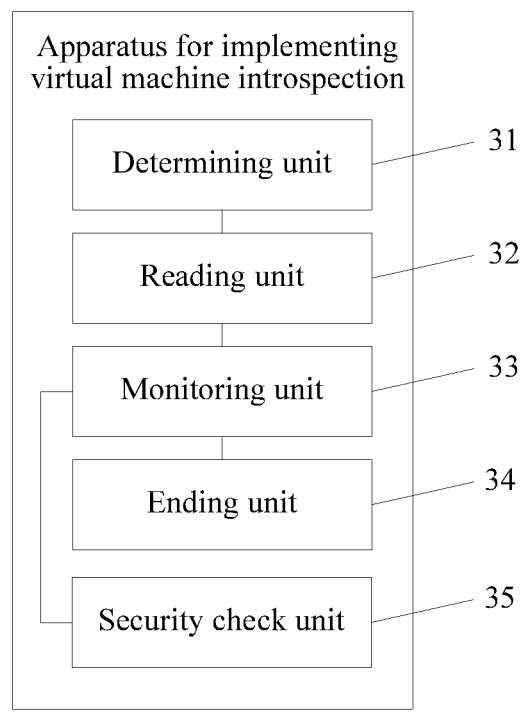
FIG. 3 is a schematic structural diagram of a virtual apparatus of an apparatus for implementing virtual machine introspection according to an embodiment.

This embodiment provides an apparatus for implementing virtual machine introspection. As shown in FIG. 3, the apparatus may include: a determining unit 31 configured to determine to-be-checked data in a virtual machine; a read unit 32 configured to read the to-be-checked data determined by the determining unit 31, save a copy of the read to-be-checked data, and store a storage address of the read to-be-checked data in a hardware transactional memory; a monitoring unit 33 configured to monitor, by using the hardware transactional memory, whether the read to-be-checked data corresponding to the storage address is modified; an ending unit 34 configured to, when the monitoring unit 33 detects that the read to-be-checked data is modified, stop reading the to-be-checked data, and delete the copy; and a security check unit 35 configured to, when the reading unit 32 completes reading the to-be-checked data and the monitoring unit 33 does not detect that the read to-be-checked data is modified, perform security check on the copy of the to-be-checked data.

In this embodiment, in a process of reading to-be-checked data, whether the read to-be-checked data is modified may be monitored by using a hardware transactional memory. If it is not detected, in the process of reading the to-be-checked data, that modified data exists in the read to-be-checked data, it represents that the copy of the to-be-checked data is consistent with to-be-checked data in a virtual machine. In this case, security check may be performed on the copy. If it is detected, in the process of reading the to-be-checked data, that modified data exists in the read to-be-checked data, reading the to-be-checked data is stopped, and the copy of the to-be-checked data is deleted, that is, security check is not performed on the to-be-checked data. In this way, accuracy of the security check is improved.

Figure 4:
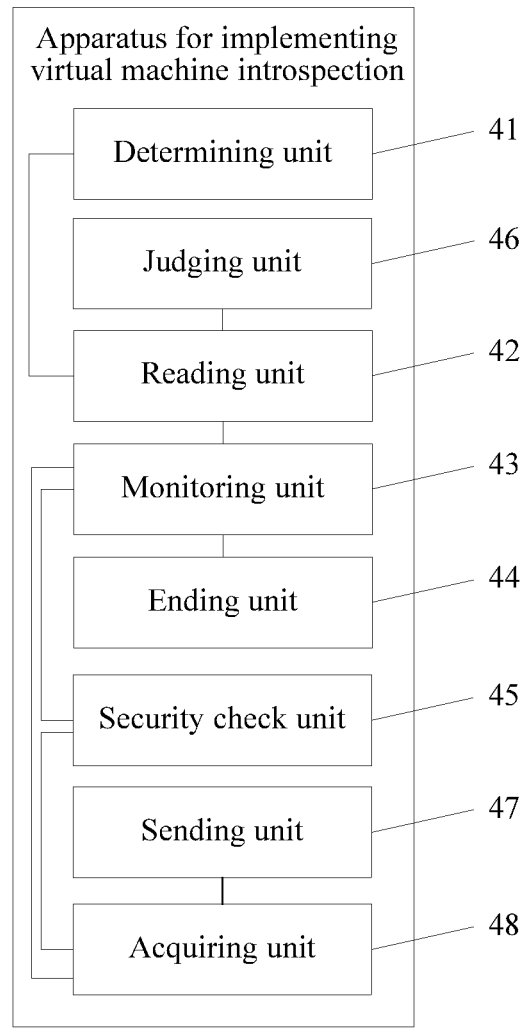
FIG. 4 is a schematic structural diagram of another virtual apparatus of an apparatus for implementing virtual machine introspection according to an embodiment.

This embodiment provides another apparatus for implementing virtual machine introspection. The apparatus is further expansion of the apparatus shown in FIG. 3. As shown in FIG. 4, the apparatus may include: a determining unit 41 configured to determine to-be-checked data in a virtual machine; a reading unit 42 configured to read the to-be-checked data determined by the determining unit 41; save a copy of the read to-be-checked data and store a storage address of the read to-be-checked data in a hardware transactional memory; a monitoring unit 43 configured to monitor, by using the hardware transactional memory, whether the read to-be-checked data corresponding to the storage address is modified; a ending unit 44 configured to, when the monitoring unit 43 detects that the read to-be-checked data is modified, stop reading the to-be-checked data, and delete the copy of the to-be-checked data; and a security check unit 45 configured to, when the reading unit 42 completes reading the to-be-checked data and the monitoring unit 43 does not detect that the read to-be-checked data is modified, perform security check on the copy of the to-be-checked data.

Further, the copy, saved by the reading unit 42, of the to-be-checked data includes lock-related data, where the lock-related data is used to represent whether the to-be-checked data determined by the determining unit 41 is being accessed currently.

The apparatus further includes a judging unit 46 configured to, after the determining unit 41 determines the to-be-checked data in the virtual machine, determine whether a lock corresponding to the lock-related data is in a release state, where the release state is used to represent that the to-be-checked data is not accessed currently, where the reading unit 42 is further configured to, if the lock corresponding to the lock-related data is in the release state, start to read the to-be-checked data, save the copy of the read to-be-checked data, and store the storage address of the read to-be-checked data in the hardware transactional memory, so that the hardware transactional memory is capable of monitoring the read to-be-checked data according to the storage address.

Further, the security check unit 45 is further configured to check integrity of the copy, saved by the reading unit 42, of the to-be-checked data; and/or determine, according to the copy, saved by the reading unit 42, of the to-be-checked data, whether malware exists in a system in which the virtual machine runs.

Further, the apparatus further includes a sending unit 47 configured to, when the security check unit 45 completes the security check that is performed on the copy, saved by the reading unit 42, of the to-be-checked data, if the security check performed by the security check unit 45 on the copy of the to-be-checked data fails, send a security check failure message to the virtual machine, so that the virtual machine performs corresponding processing according to the security check failure message sent by the sending unit 47.

Further, the apparatus further includes an acquiring unit 48 configured to, when the monitoring unit 43 detects that the read to-be-checked data is modified, acquire a storage address of modified to-be-checked data, where the sending unit 47 is further configured to, when the acquiring unit 48 acquires the storage address of the modified data in the read to-be-checked data, send an access violation message to the virtual machine, where the access violation message includes the storage address of the modified to-be-checked data, so that the virtual machine determines whether a process for modifying the modified to-be-stored data is a secure process.

In this embodiment, in a process of reading to-be-checked data, whether the read to-be-checked data is modified is monitored by using a hardware transactional memory. If it is not detected, in the process of reading the to-be-checked data, that modified data exists in the read to-be-checked data, it represents that a copy of the to-be-checked data is consistent with to-be-checked data in a virtual machine. In this case, security check may be performed on the copy of the to-be-checked data. If it is detected, in the process of reading the to-be-checked data, that modified data exists in the read to-be-checked data, reading the to-be-checked data is stopped, and the copy of the to-be-checked data is deleted, that is, security check is not performed on the to-be-checked data. In this way, accuracy of the security check is improved.

In addition, the present disclosure further describes that, before the to-be-checked data is read, it is first determined whether a lock of the to-be-checked data is in a release state. The to-be-checked data is read only when the lock is in the release state. In this way, it is ensured that when reading the to-be-checked data is started, no other process accesses the to-be-checked data, so that occurrence times of an access violation is decreased, and further, a probability that the read to-be-checked data is modified in the reading process is reduced. Further, lock-related data corresponding to the lock may be read, that is, the copy of the to-be-checked data includes the lock-related data. In this way, after reading the lock-related data is completed, a storage address of the lock-related data in the virtual machine is stored in the hardware transactional memory, and the hardware transactional memory further monitors the lock-related data. If it is not detected, in the process of reading the to-be-checked data, that modified data exists in the read to-be-checked data, not only it may represent that the copy of the to-be-checked data is consistent with the to-be-checked data in the virtual machine, but also it may represent that in the process of reading the to-be-checked data, no other process accesses the to-be-checked data, so that consistency between the copy of the to-be-checked data and the to-be-checked data in the virtual machine is ensured more strictly.

Further, the present disclosure further describes that, if the read to-be-checked data is modified in the reading process, a storage address of modified data in the read to-be-checked data is acquired, and an access violation message is sent to the virtual machine; the virtual machine may immediately locate, according to the storage address of the modified data in the access violation message, a location at which violation access occurs, and determine whether a process for modifying the modified data is a secure process. In this way, determining, by the virtual machine, the location at which the violation access occurs is accelerated, so that efficiency of detecting malware is improved. Therefore, security of the virtual machine is improved.

The following provides some embodiments of a physical apparatus, and the embodiments of a physical apparatus respectively correspond to the corresponding method embodiments and the embodiments of the virtual apparatus that are provided in the foregoing.

Figure 5:
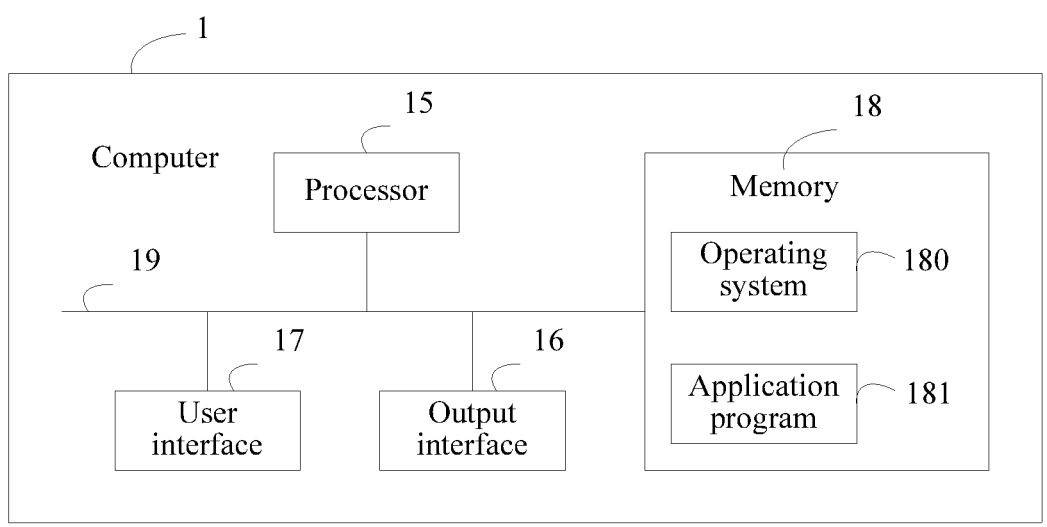
FIG. 5 is a schematic structural diagram of a physical apparatus of an apparatus for implementing virtual machine introspection according to an embodiment.

This embodiment further provides a computer 1. As shown in FIG. 5, the computer 1 includes at least one processor 15, such as a central processing unit (CPU), at least one output interface 16 or another user interface 17, a memory 18, and at least one communications bus 19. The communications bus 19 is configured to implement a connection and communication between the foregoing components. The computer 1 optionally includes the another user interface 17, including a display, a keyboard, or a click device (such as a mouse, a trackball, a touchpad, or a touch display screen). The memory 18 may include a high speed random access memory (RAM), and may further include a non-volatile memory, for example, at least one magnetic disk storage. Optionally, the memory 18 may include at least one storage apparatus that is located far away from the processor 15.

In some implementation manners, the memory 18 stores the following elements: an executable module or a data structure, or subsets thereof, or extension sets thereof: an operating system 180, including various system programs and configured to implement various basic services and process a hardware-based task.

An application program 181 may include, but not be limited to: a determining unit configured to determine to-be-checked data in a virtual machine; a reading unit configured to read the to-be-checked data determined by the determining unit, save a copy of the read to-be-checked data, and store a storage address of the read to-be-checked data in a hardware transactional memory; a monitoring unit configured to monitor, by using the hardware transactional memory, whether the read to-be-checked data corresponding to the storage address is modified; a ending unit configured to, when the monitoring unit detects that the read to-be-checked data is modified, stop reading the to-be-checked data, and delete the copy; and a security check unit configured to, when the reading unit completes reading the to-be-checked data and the monitoring unit does not detect that the read to-be-checked data is modified, perform security check on the copy.

Further, the copy saved by the reading unit includes lock-related data, where the lock-related data is used to represent whether the to-be-checked data determined by the determining unit is being accessed currently.

The application program 181 may further include a judging unit configured to, after the determining unit determines the to-be-checked data in the virtual machine, determine whether a lock corresponding to the lock-related data is in a release state, where the release state is used to represent that the to-be-checked data is not accessed currently, where the reading unit is further configured to, if the lock corresponding to the lock-related data is in the release state, start to read the to-be-checked data, save the copy of the read to-be-checked data, and store the storage address of the read to-be-checked data in the hardware transactional memory, so that the hardware transactional memory is capable of monitoring the read to-be-checked data according to the storage address.

Further, the security check unit is further configured to check integrity of the copy saved by the reading unit and/or determine, according to the copy saved by the reading unit, whether malware exists in a system in which the virtual machine runs.

Further, the application program 181 may further include: a sending unit configured to, when the security check unit completes the security check that is performed on the copy saved by the reading unit, if the security check performed by the security check unit on the copy fails, send a security check failure message to the virtual machine, so that the virtual machine performs corresponding processing according to the security check failure message sent by the sending unit.

Further, the application program 181 may further include an acquiring unit configured to, when the monitoring unit detects that the read to-be-checked data is modified, acquire a storage address of modified to-be-checked data, where the sending unit is further configured to, when the acquiring unit acquires the storage address of the modified data in the read to-be-checked data, send an access violation message to the virtual machine, where the access violation message includes the storage address of the modified to-be-checked data, so that the virtual machine determines whether a process for modifying the modified to-be-stored data is a secure process.

In this embodiment of the present disclosure, by invoking a program or an instruction stored in the memory 18, the processor 15 is configured to: determine to-be-checked data in a virtual machine; start to read the to-be-checked data, save a copy of the read to-be-checked data, and store a storage address of the read to-be-checked data in a hardware transactional memory, so that the hardware transactional memory is capable of monitoring the read to-be-checked data according to the storage address; when it is detected that the read to-be-checked data is modified, stop reading the to-be-checked data, and delete the copy; and when reading the to-be-checked data is completed and it is not detected that the read to-be-checked data is modified, perform security check on the copy.

Further, the to-be-checked data includes lock-related data, where the lock-related data is used to represent whether the to-be-checked data is being accessed currently.

The processor 15 is further configured to, after determining the to-be-checked data in the virtual machine, determine whether a lock corresponding to the lock-related data is in a release state, where the release state is used to represent that the to-be-checked data is not accessed currently.

The processor 15 is further configured to, if the lock corresponding to the lock-related data is in the release state, start to read the to-be-checked data, save the copy of the read to-be-checked data, and store the storage address of the read to-be-checked data in the hardware transactional memory, so that the hardware transactional memory is capable of monitoring the read to-be-checked data according to the storage address.

Further, the processor 15 is further configured to check integrity of the copy; and/or determine, according to the copy, whether malware exists in a system in which the virtual machine runs.

Further, the processor 15 is further configured to, after performing security check on the copy, if the security check on the copy fails, send a security check failure message to the virtual machine, so that the virtual machine performs corresponding processing according to the security check failure message.

Further, the processor 15 is further configured to, when it is detected that the read to-be-checked data is modified, acquire a storage address of modified to-be-checked data; and send an access violation message to the virtual machine, where the access violation message includes the storage address of the modified to-be-checked data, so that the virtual machine determines whether a process for modifying the modified to-be-stored data is a secure process.

In this embodiment, to-be-checked data in a virtual machine is determined; reading the to-be-checked data is started, a copy of the read to-be-checked data is saved, and a storage address of the read to-be-checked data is stored in a hardware transactional memory, so that the hardware transactional memory is capable of monitoring the read to-be-checked data according to the storage address; when it is detected that the read to-be-checked data is modified, reading the to-be-checked data is stopped, and the copy is deleted; when reading the to-be-checked data is completed and it is not detected that the read to-be-checked data is modified, security check is performed on the copy. After the foregoing solution is used, in a process of reading the to-be-checked data, whether the read to-be-checked data is modified may be monitored by using the hardware transactional memory. If it is not detected, in the process of reading the to-be-checked data, that modified data exists in the read to-be-checked data, it represents that the copy is consistent with the to-be-checked data in the virtual machine. In this case, security check may be performed on the copy. If it is detected, in the process of reading the to-be-checked data, that modified data exists in the read to-be-checked data, reading the to-be-checked data is stopped, and the copy is deleted, that is, security check is not performed on the to-be-checked data. In this way, accuracy of the security check is improved.

In addition, the present disclosure further describes that, before the to-be-checked data is read, it is first determined whether a lock of the to-be-checked data is in a release state. The to-be-checked data is read only when the lock is in the release state. In this way, it is ensured that when reading the to-be-checked data is started, no other process accesses the to-be-checked data, so that occurrence times of an access violation is decreased, and further, a probability that the read to-be-checked data is modified in the reading process is reduced. Further, lock-related data corresponding to the lock may be read, that is, the copy includes the lock-related data. In this way, after reading the lock-related data is completed, a storage address of the lock-related data in the virtual machine is stored in the hardware transactional memory, and the hardware transactional memory further monitors the lock-related data. If it is not detected, in the process of reading the to-be-checked data, that modified data exists in the read to-be-checked data, not only it may represent that the copy is consistent with the to-be-checked data in the virtual machine, but also it may represent that in the process of reading the to-be-checked data, no other process accesses the to-be-checked data, so that consistency between the copy and the to-be-checked data in the virtual machine is ensured more strictly.

Further, the present disclosure further describes that, if the read to-be-checked data is modified in the reading process, a storage address of modified data in the read to-be-checked data is acquired, and an access violation message is sent to the virtual machine; the virtual machine may immediately locate, according to the storage address of the modified data in the access violation message, a location at which violation access occurs, and determine whether a process for modifying the modified data is a secure process. In this way, determining, by the virtual machine, the location at which the violation access occurs is accelerated, so that efficiency of detecting malware is improved. Therefore, security of the virtual machine is improved.

Based on the foregoing descriptions of the implementation manners, a person skilled in the art may clearly understand that the present disclosure may be implemented by software in addition to necessary universal hardware or by hardware only. In most circumstances, the former is an exemplary implementation manner. Based on such an understanding, the technical solutions of the present disclosure essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for implementing virtual machine introspection, comprising:
   determining to-be-checked data in a virtual machine;
   starting to read the to-be-checked data;
   saving a copy of the read to-be-checked data;
   storing a storage address of the read to-be-checked data in a hardware transactional memory, wherein the hardware transactional memory is capable of monitoring the read to-be-checked data according to the storage address;
   stop reading the to-be-checked data and deleting the copy when the read to-be-checked data is modified; and
   performing security check on the copy when reading the to-be-checked data is completed and it is not detected that the read to-be-checked data is modified,
   wherein the to-be-checked data comprises lock-related data, wherein the lock-related data is used to represent whether the to-be-checked data is being accessed currently, wherein after determining the to-be-checked data in the virtual machine, the method further comprises determining whether a lock corresponding to the lock-related data is in a release state, wherein the release state is used to represent that the to-be-checked data is not accessed currently, and wherein starting to read the to-be-checked data, saving the copy of the read to-be-checked data, and storing the storage address of the read to-be-checked data in the hardware transactional memory comprises:

starting to read the to-be-checked data;

saving the copy of the read to-be-checked data; and storing the storage address of the read to-be-checked data in the hardware transactional memory when the lock corresponding to the lock-related data is in the release state, wherein the hardware transactional memory is capable of monitoring the read to-be-checked data according to the storage address.

2. The method for implementing virtual machine introspection according to claim 1, wherein performing the security check on the copy comprises:

checking integrity of the copy; and determining, according to the copy, whether malware exists in a system in which the virtual machine runs.

3. The method for implementing virtual machine introspection according to claim 1, wherein performing the security check on the copy comprises checking integrity of the copy.

4. The method for implementing virtual machine introspection according to claim 1, wherein performing the security check on the copy comprises determining, according to the copy, whether malware exists in a system in which the virtual machine runs.

5. The method for implementing virtual machine introspection according to claim 1, wherein after performing security check on the copy, the method further comprises sending a security check failure message to the virtual machine when the security check on the copy fails, and wherein the virtual machine performs corresponding processing according to the security check failure message.

6. The method for implementing virtual machine introspection according to claim 1, wherein the method further comprises:

acquiring a storage address of modified to-be-checked data when the read to-be-checked data is modified; and sending an access violation message to the virtual machine, wherein the access violation message comprises the storage address of the modified to-be-checked data, and wherein the virtual machine determines whether a process for modifying the modified to-be-stored data is a secure process.

7. An apparatus for implementing virtual machine introspection, comprising:

a memory comprising instructions; and a processor coupled to the memory, wherein the instructions cause the process to be configured to:

determine to-be-checked data in a virtual machine;

read the to-be-checked data;

save a copy of the read to-be-checked data and store a storage address of the read to-be-checked data in a hardware transactional memory;

monitor, by using the hardware transactional memory, whether the read to-be-checked data corresponding to the storage address is modified;

stop reading the to-be-checked data, and delete the copy when the read to-be-checked data is modified; and perform security check on the copy when reading the to-be-checked data and when the read to-be-checked data is not modified, wherein the copy comprises lock-related data, wherein the lock-related data is used to represent whether the to-be-checked data is being accessed, and wherein the instructions further cause the processor to be configured to:

determine whether a lock corresponding to the lock-related data is in a release state after determining the to-be-checked data in the virtual machine, wherein the release state is used to represent that the to-be-checked data is not accessed currently;

start to read the to-be-checked data;

save the copy of the read to-be-checked data; and store the storage address of the read to-be-checked data in the hardware transactional memory when the lock corresponding to the lock-related data is in the release state, wherein the hardware transactional memory is capable of monitoring the read to-be-checked data according to the storage address.

8. The apparatus for implementing virtual machine introspection according to claim 7, wherein the instructions further cause the processor to be configured to:

check an integrity of the copy; and determine, according to the copy, whether malware exists in a system in which the virtual machine runs.

9. The apparatus for implementing virtual machine introspection according to claim 7, wherein the instructions further cause the processor to be configured to check an integrity of the copy.

10. The apparatus for implementing virtual machine introspection according to claim 7, wherein the instructions further cause the processor to be configured to determine, according to the copy, whether malware exists in a system in which the virtual machine runs.

11. The apparatus for implementing virtual machine introspection according to claim 7, wherein the instructions further cause the processor to be configured to send a security check failure message to the virtual machine when the security check that is performed on the copy is completed, wherein the security check on the copy fails, and wherein the virtual machine performs corresponding processing according to the security check failure message.

12. The apparatus for implementing virtual machine introspection according to claim 7, wherein the instructions further cause the processor to be configured to:

acquire a storage address of modified to-be-checked data when the read to-be-checked data is modified; and send an access violation message to the virtual machine when the storage address of the modified data in the read to-be-checked data is acquired, wherein the access violation message comprises the storage address of the modified to-be-checked data, and wherein the virtual machine determines whether a process for modifying the modified to-be-stored data is a secure process.

* * * * *